US006224708B1

(12) United States Patent
Göttling et al.

(10) Patent No.: US 6,224,708 B1
(45) Date of Patent: May 1, 2001

(54) PROCESS FOR PRODUCING A PRINTING FORM

(75) Inventors: Josef Göttling, Friedberg; Josef Schneider, Diedorf-Lettenbach, both of (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 0 days.

(21) Appl. No.: 09/201,051

(22) Filed: Nov. 30, 1998

(30) Foreign Application Priority Data

Nov. 28, 1997 (DE) ............................................ 197 52 715

(51) Int. Cl.[7] ........................... B32B 31/18; B32B 31/28; B44C 1/165; B41M 5/24; G03C 1/00

(52) U.S. Cl. .......................... 156/250; 156/230; 156/240; 156/234; 156/294; 156/272.2; 427/146; 427/148; 427/487; 101/463.1; 101/471; 430/269; 430/945; 425/14

(58) Field of Search .................................... 156/230, 234, 156/238, 240, 247, 250, 277, 289, 293, 272.2, 294; 101/463.1, 465, 467, 470, 471; 430/945, 269, 328; 29/235; 425/14; 140/93.4; 277/607, 634; 285/417; 427/487, 146, 148

(56) References Cited

U.S. PATENT DOCUMENTS

| | | | | |
|---|---|---|---|---|
| 4,063,949 | * | 12/1977 | Uhlig et al. | 96/27 E |
| 4,685,189 | * | 8/1987 | Palmqvist et al. | 29/450 |
| 5,440,987 | * | 8/1995 | Williams et al. | 101/454 |
| 5,709,765 | * | 1/1998 | Herbert et al. | 156/293 |

FOREIGN PATENT DOCUMENTS

| | | |
|---|---|---|
| 44 14 084 | 10/1995 | (DE) . |
| 44 30 555 | 4/1996 | (DE) . |
| 664 211 | 7/1995 | (EP) . |

* cited by examiner

*Primary Examiner*—Richard Crispino
*Assistant Examiner*—J. A. Lorengo
(74) *Attorney, Agent, or Firm*—Cohen, Pontani, Lieberman & Pavane

(57) ABSTRACT

A process for producing a printing form on a form cylinder, which process operates reliably even in the case of large form cylinders and high laser powers, contains the process steps of drawing a blown film tube onto the form cylinder, transferring surface elements of the tubular film, in accordance with an image, as a result of heating by a laser beam, and removing the blown film tube from the form cylinder.

17 Claims, 4 Drawing Sheets

PROCESS FOR PRODUCING A PRINTING FORM

SUMMARY OF THE INVENTION

1. Field of the Invention

The invention relates to a process for producing a printing form on a form cylinder by applying a surface layer.

2. Discussion of the Prior Art

According to German reference DE 44 30 555 C1, a printing form is produced on a form cylinder so that a surface layer is transferred from a transfer film strip to the printing form as a result of heating by means of a laser beam. In this case, the transfer film strip is carried along with the movement of the laser beam. In addition, for the purpose of renewal, the strip is unwound from a supply reel and wound up onto another reel.

The disadvantage with this teaching is that, in the case of large-format form cylinders, the spooling device for the film strip requires large supply reels in order to have an adequate storage capacity. In addition, a higher transport speed of the transfer film can lead to problems, as a result of relatively high laser powers, for example to static charging and resultant lifting from the printing form. Finally, transfer film strips have a tendency to so-called microbanding, that is to say to thermal drop-off at the strip edges, which leads to streaky transfer of surface elements and ultimately to a streaky printed image.

SUMMARY OF THE INVENTION

The object of the present invention is to provide a process for producing a printing form which operates reliably even in the case of large form cylinders and high laser powers.

Pursuant to this object, and others which will become apparent hereafter, one aspect of the present invention resides in a process for producing a printing form on a form cylinder by applying a surface layer, which process includes the steps of applying a blown film molding to the form cylinder, which blown film molding carries the surface layer as a coating on its inner side, transferring surface elements of the surface layer, in accordance with an image, by heating with a laser beam, and removing the blown film molding from the form cylinder. By virtue of the blown film molding, spooling devices for a strip-like transfer film, together with the above-mentioned disadvantages, are rendered superfluous. In addition, the microbanding caused by the edge zones is dispensed with, which provides the preconditions for reliable layer transfer and good plate and printing quality. Furthermore, the degree of utilization of the transfer film is very high.

In another embodiment of the invention the step of applying a blown film molding includes drawing a tubular film that has been expanded by compressed air onto the form cylinder and subsequently fixing the film on the form cylinder by turning off the compressed air. It is often desirable to also utilize heated compressed air.

BRIEF DESCRIPTION OF THE DRAWINGS

In the associated drawings, in each case in schematic form.

DETAILED DESCRIPTION OF THE PREFERRED EMBODIMENTS

Figure 1:
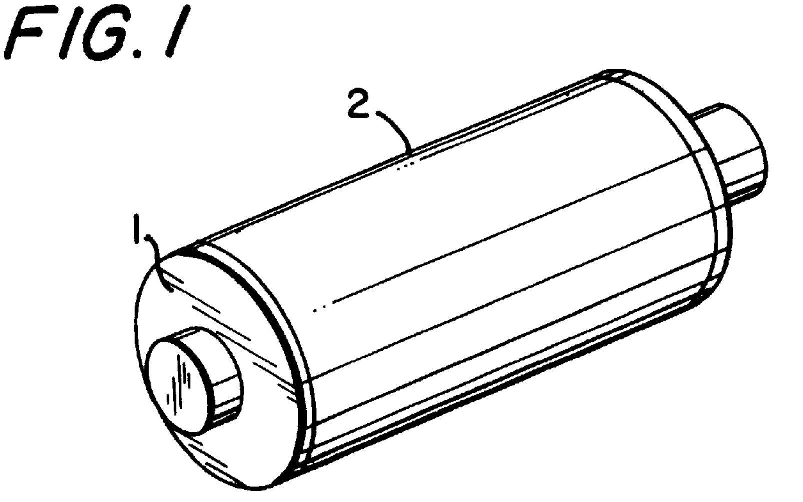
FIG. 1 shows a form cylinder with an uncoated printing form.

FIG. 1 shows a form cylinder 1, which carries a printing form 2 which has no image. The printing form 2 is sleeve-like in this case, but may also be plate-like or may be applied directly to the cover of the form cylinder 1. In the case of a plate, the form cylinder 1 bears a clamping slot (see FIG. 6) or other type of clamping means, with which the start and end of the printing form are clamped. The form cylinder 1, which is located in a printing machine, can be exposed at one journal end, for example in such a way as shown in German reference DE 44 14 084 A1. It can also be mounted in a cantilevered manner from the start or else removed from the printing machine.

Figure 2:
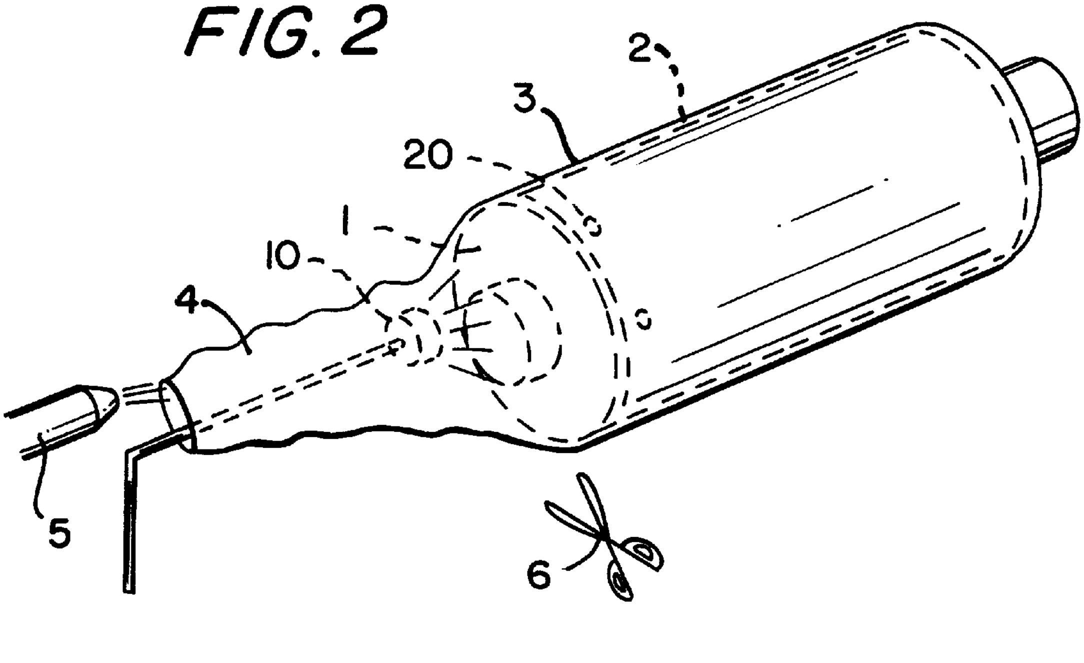
FIG. 2 shows a tubular film that has been drawn on and the compressed-air feed through the film.

From the freely accessible end of the form cylinder 1, a tubular film 3 that is cut from a tube supply is drawn onto the cylinder 1. On its inner side, the tubular film 3 carries a coating which, within the context of imaging the printing form 2, is to be transferred to the printing form 2. The tubular film 3 has an internal diameter that is slightly smaller than the form cylinder 1. It is therefore firstly expanded with compressed air. For this purpose, the compressed air is introduced into that section 4 which has not yet been drawn on by means of a compressed-air feed 5 (FIG. 2). The tubular film 3 that has been drawn on is subsequently fixed by turning off the compressed air. After this a surplus region of the tubular film 3, which was required for the introduction of the compressed air, is cut off using a cutting device 6. This may be carried out, for example, manually using scissors or any other kind of cutting device.

In the case of this and the following exemplary embodiments, use is advantageously made of heated compressed air, as a result of which the tubular film 3 or blown film molding can additionally be expanded under the action of heat and can be shrunk as it cools down.

The application of the surface layer to the tubular film 3 may be carried out by spraying immediately before said film is drawn on. A spray nozzle 10, which for this purpose reaches into the section 4 that has not yet been drawn on, is shown in FIG. 2. It is also possible firstly to provide a tubular film with the surface layer on the outside, and then to turn it inside out, so that the surface layer comes to lie on the inner side.

Figure 3:
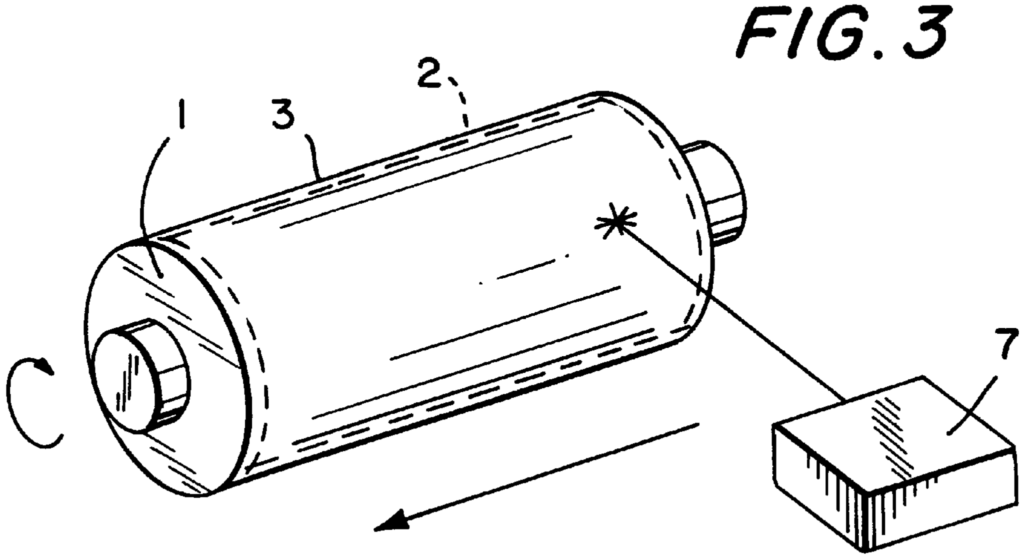
FIG. 3 shows the imaging operation, in which a laser traverses the length of the printing cylinder.

After the tubular film 3 has been drawn on, the coating of the printing form 2 in accordance with an image is carried out. This takes place in a manner known per se by means of traversing and/or scanning over the form cylinder 1 by means of a laser 7 (FIG. 3). The laser beam or beams from the laser 7, which is activated in accordance with the image, heats or heat surface elements of the surface layer of the tubular film, which are transferred to the printing form 2 during the process.

Figure 4:
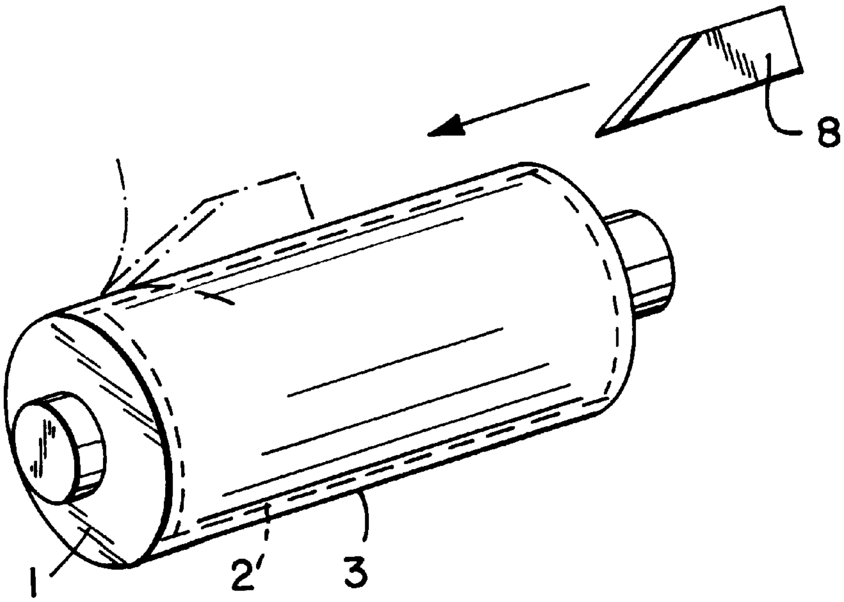
FIG. 4 shows a severing device which, following the imaging, cuts open the tubular film along the cylinder.
Figure 5:
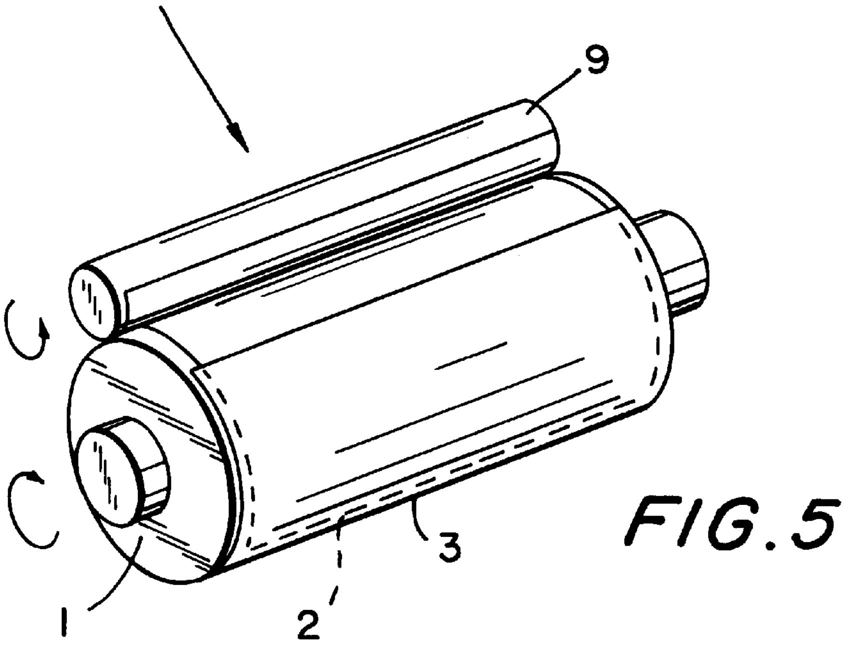
FIG. 5 shows a drawing-off device for the cut-open tubular film.

Following the transfer of the surface elements, the tubular film 3 is cut open. This can be carried out, for example, by means of a wedge-shaped knife 8 that is pushed under the tubular film 3 (FIG. 4). The film 3 is advantageously cut open in the direction of the longitudinal axis of the form cylinder 1. A roll 9 is placed onto the cut edge region that is produced (FIG. 5), and makes an adhesive joint with the cut-open tubular film 3. Use is advantageously made of a glued rubber roller. The form cylinder 1 and the roller 9 are now rotated in opposite directions, the film 3 being drawn off the form cylinder 1 and spooled up onto the roller 9.

The tubular film 3 can also be removed from the form cylinder 1 by the tubular film being expanded using compressed air. In this case the form cylinder 1 bears appropriate blow holes 20 on its cover. Advantageously, holes 20 of this type are used in the case of a form cylinder 1 that is covered by an endless printing form, the blow holes 20 being located in the region of the clamping channel and being brought into alignment with through holes in the printing form 2.

When the process is applied in the case of form cylinders 1 having a channel, large channels should be filled with a filler piece, in order that the compressed air cannot escape. Slot-like clamping channels may be covered, for example, with a silicone rubber layer.

It is also possible for the tubular film 3 to have been cut to the finished length required for the imaging before being drawn on, part lengths of the cylinder cover also being considered, for example of the width of one plate. In these cases, the expansion is carried out by means of the above-mentioned blow holes 20 in the cover of the form cylinder 1. The tubular film 3 may also be provided in the form of ready-made covers with a base. After being drawn on, the base, if it interferes during imaging, can be cut off at the edge of the form cylinder 1.

Figure 7:
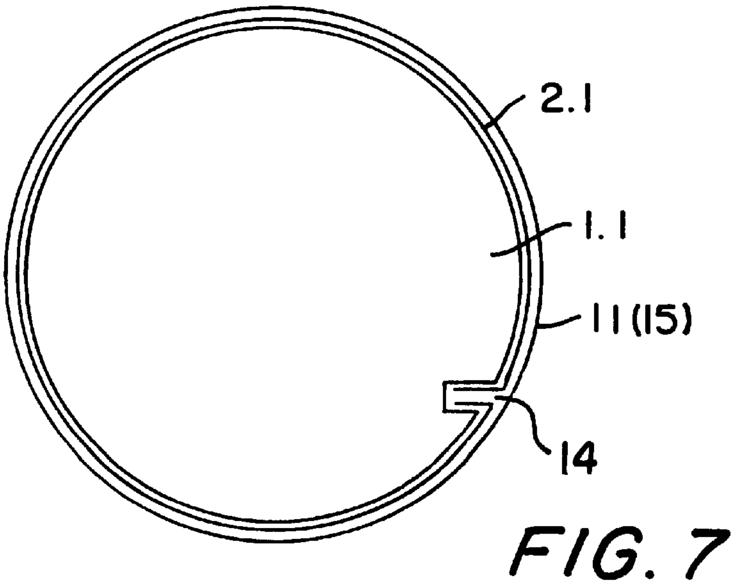
FIG. 7 shows the form cylinder according to FIG. 6 following the welding of the film web.
Figure 6:
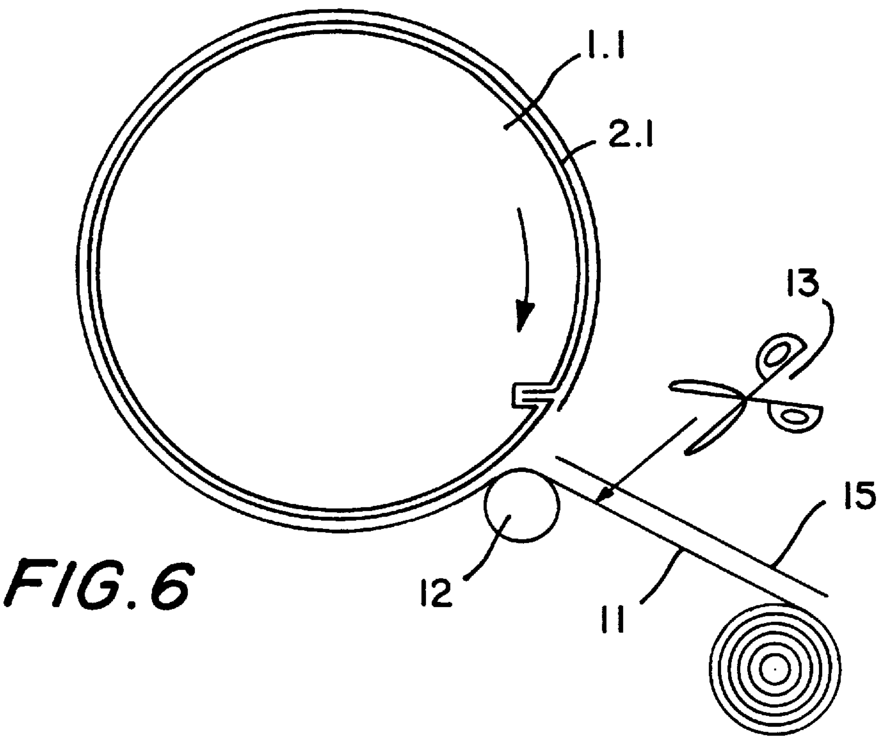
FIG. 6 shows a form cylinder, to which a film web is applied.

According to FIG. 6, a film web 11 carrying the surface layer is fed to the form cylinder 1.1, the film web 11 being wound in one layer onto the form cylinder 1.1 with the surface layer pointing toward the form cylinder 1.1. Good contact with the form cylinder 1.1 is achieved by rolling on (ironing on) by means of a nip roller 12. The surplus supply of film web 11 is subsequently cut off by means of a cutting device 13. Finally, the butt joint 14 at the ends of the film web 11 located on the form cylinder 1.1 is welded and a hollow body is formed from the web 11. FIG. 7 shows this state. The imaging of the printing form is carried out as described in relation to FIG. 3. However, as distinct from the preceding embodiment, the form cylinder 1.1 carries, as an exemplary design variant, an endless, therefore plate-like, printing form 2.1. The butt joint 14 of the film is advantageously placed in the region of the clamping device of the printing form 2.1. The removal of the film following the transfer of the surface layer in accordance with the image is carried out with one of the options already described, that is to say, for example, by slitting it open by means of a knife 8 or expanding it by means of compressed air and pushing the tubular film sleeve off. Instead of the film web 11, a sheet of film 15 carrying the surface layer can also be fed to the form cylinder 1.1. Such a sheet of film 15 is also drawn in FIG. 6. This sheet of film 15 is wound around the form cylinder 1.1 with the surface layer pointing toward the latter, and is welded at the butt joint 14 at the ends of the sheet of film 15. The further procedure is analogous to the exemplary embodiments already described, for which reason repetitive descriptions are superfluous.

Figure 8:
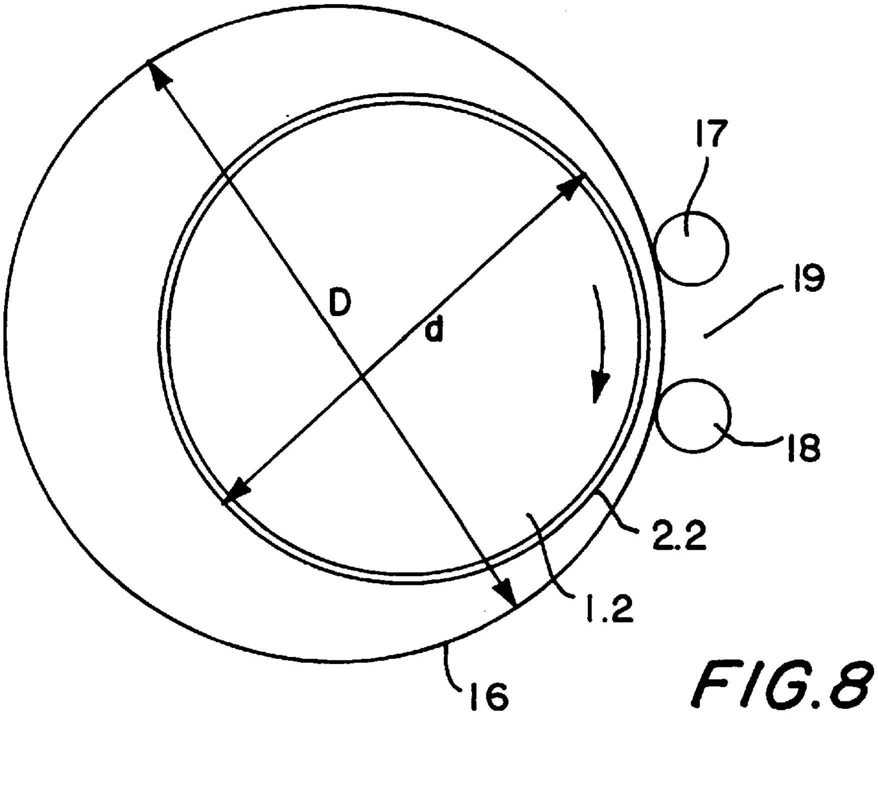
FIG. 8 shows a form cylinder with a film tube pushed onto it.

According to FIG. 8, a film tube 16 is pushed onto a form cylinder 1.2. The form cylinder 1.2 is, for example, the cylinder of an imaging device, which carries the printing form to be coated in accordance with an image, for example a sleeve-like printing form 2.2. The inner diameter D of the film tube 16 is greater than the outer diameter d of the form cylinder 1.2, that is to say, strictly speaking, larger than the outer diameter measured over the printing form 2.2. The film tube 16 is pressed onto the form cylinder 1.2 in a contact region 19 using at least two nip rolls 17, 18. In this contact region 19, the film tube 16 is in rolling contact with the form cylinder 1.2, that is to say the film tube 16 and the form cylinder 1.2 roll on each other during rotation of the form cylinder 1.2. The coating of the printing form 2.2 in accordance with the image takes place in the contact region 19. Then, after the nip rolls 17, 18 have been moved away, the film tube 16 is drawn axially off the form cylinder 1.2. Likewise, the sleeve-like printing form 2.2 is drawn axially off the form cylinder 1.2 and pushed onto a form cylinder which is located in a printing machine.

The invention is not limited by the embodiments described above which are presented as examples only but can be modified in various ways within the scope of protection defined by the appended patent claims.

We claim:

1. A process for producing a printing form on a form cylinder by applying a surface layer, comprising the steps of:

applying a blown film molding to the form cylinder by drawing a tubular film that has been expanded by compressed air onto the form cylinder and subsequently fixing the film on the form cylinder by turning off the compressed air, which blown film molding carries the surface layer as a coating on its inner side;

transferring surface elements of the surface layer, in accordance with an image, by heating with an appropriately controlled laser beam; and removing the blown film molding from the form cylinder.

2. A process as defined in claim 1, including cutting off a surplus region of the tubular film after being drawn onto the form cylinder.

3. A process as defined in claim 1, including drawing the tubular film onto the form cylinder after cutting the film to a required length.

4. A process as defined in claim 1, including supplying the compressed air so that the compressed air emerges from blow holes in the form cylinder.

5. A process as defined in claim 1, including introducing the compressed air into a section of the tubular film that has not yet been drawn on the form cylinder.

6. A process as defined in claim 1, wherein the steps of drawing the tubular film onto the form cylinder includes expanding the film with compressed air supplied via blow holes in the form cylinder, and subsequently pushing the tubular film off the form cylinder.

7. A process as defined in claim 1, wherein the removing step includes removing film from the form cylinder by cutting the film open in a longitudinal direction of the form cylinder and drawing the film off the form cylinder.

8. A process as defined in claim 1, wherein the applying step includes drawing the blown film molding onto a form cylinder which is located in a printing machine.

9. A process as defined in claim 1, wherein the applying step includes drawing the blown film molding onto a form cylinder located outside a printing machine.

10. A process as defined in claim 1, including spraying the surface layer onto the inner side of the tubular film during the step of applying the tubular film.

11. A process as defined in claim 1, including applying the surface layer to an outer side of the tubular film and subsequently turning the tubular film inside out.

12. A process for producing a printing form on a form cylinder by applying a surface layer, comprising the steps of:

applying a blown film molding to the form cylinder by drawing a tubular film that has been expanded by heated compressed air onto the form cylinder and subsequently fixing the film on the form cylinder by turning off the heated compressed air, the blown film molding carrying the surface layer as a coating on its inner side;

transferring surface elements of the surface layer, in accordance with an image, by heating with an appropriately controlled laser beam; and removing the blown film molding from the form cylinder.

13. A process for producing a printing form on a form cylinder by applying a surface layer, comprising the steps of:

applying a blown film molding to the form cylinder, which blown film molding carries the surface layer as a coating on its inner side;

transferring surface elements of the surface layer, in accordance with an image, by heating with an appropriately controlled laser beam; and removing the blown film molding from the form cylinder by cutting the cylinder open in a longitudinal direction of the form cylinder and drawing the film off the form cylinder, the removing step including placing a roller on the cut-off film in a region of an edge of the cut so as to make an adhesive joint with the cut edge region and, while rotating, drawing the film off the form cylinder and spooling up the film.

14. A process for producing a printing form on a form cylinder by applying a surface layer, comprising the steps of:

applying a blown film molding to the form cylinder, which blown film molding carries the surface layer as a coating on its inner side, the applying step including applying a film tube to the form cylinder wherein an inner diameter of the film tube is greater than an outer diameter of the form cylinder and bringing the tube into rolling contact with the form cylinder in a contact region by means of nip rolls, and rolling on the form cylinder;

transferring surface elements of the surface layer, in accordance with an image, by heating with an appropriately controlled laser beam; and removing the blown film molding from the form cylinder.

15. A process for producing a printing form on a form cylinder by applying a surface layer, comprising the steps of:

applying a blown film molding to the form cylinder by laying a sheet of film carrying the surface layer onto the form cylinder with the surface layer pointing toward the form cylinder and welding a butt joint at ends of the sheet of film;

transferring surface elements of the surface layer, in accordance with an image, by heating with an appropriately controlled laser beam; and removing the blown film molding from the form cylinder by cutting the film open in a longitudinal direction of the form cylinder and drawing film off the form cylinder.

16. A process for producing a printing form on a form cylinder by applying a surface layer, comprising the steps of:

applying a blown film molding to the form cylinder by feeding a film web carrying the surface layer to the form cylinder by winding the film web in one layer onto the form cylinder with the surface layer pointing toward the form cylinder, subsequently cutting off a surplus supply of film web and welding a butt joint at ends of the film located on the form cylinder;

transferring surface elements of the surface layer, in accordance with an image, by heating with an appropriately controlled laser beam; and removing the blown film molding from the form cylinder by cutting the film open in a longitudinal direction of the form cylinder and drawing the film off the form cylinder.

17. A process as defined in claim 14, including spraying the surface layer onto the inner side of the film tube during the step of applying the film tube.

* * * * *